United States Patent Office 3,579,288
Patented May 18, 1971

3,579,288
PERMSELECTIVE CELLULOSE MEMBRANES REACTED WITH A SULFONATED TRICHLOROPYRIMIDINE DYE, 2,3 - DICHLOROQUINOXALINE DYE OR DICHLORO-s-TRIOZINES
Adalbert Suszer, Jerusalem, Israel, assignor to the State of Israel as represented by the Prime Minister's Office, Jerusalem, Israel
No Drawing. Filed Sept. 20, 1966, Ser. No. 580,595
Int. Cl. D06m *13/34*
U.S. Cl. 8—116.2                    5 Claims

ABSTRACT OF THE DISCLOSURE

A process for making permselective membranes comprises reacting a cellulosic film or parchmentized cellulosic sheet of about 0.1 mm. thickness with an aqueous solution of a sulfonated compound of the group consisting of a sulfonated trichloropyrimidine dye, a sulfonated 2,3-dichloroquinoxaline reactive dye, and a sulfonated dichloro-s-triazine, in high concentration for a period of time in the order of at least three hours until said cellulosic film or sheet is converted to a permselective membrane exhibiting permselectivity exceeding 14 mv. in a cell containing N/10 to N/20 potassium chloride, and exhibiting an electrical resistance of less than 20 ohms/cm.$^2$.

---

The present invention relates to permselective membranes and to processes of making such membranes.

Permselective membranes find extensive use in electrodialytic water desalination, among other industrial applications. A number of processes have been devised for producing such membranes, but such processes are usually quite costly and complicated or do not provide membranes having very good electrochemical and mechanical properties.

An object of the present invention is to provide novel processes for making permselective membranes which processes are simple and inexpensive and produce permselective membranes having excellent electrochemical and mechanical properties for electrodialytic water desalination and other industrial applications.

The novel membranes according to the present invention are prepared from cellulosic materials in sheet form, such as paper, kraft paper, parchmentized paper, foils and films or regenerated cellulose (e.g. cellophane), sheets of partially hydrolyzed cellulose esters, e.g. cellulose acetate, and the like. Such cellulosic sheet materials are subjected to chemical reactions with fibre-active compounds resulting in chemical bonding to the cellulosic sheet of pendant molecules which contain optionally one or more acidic functions or basic functions which thereby cause the sheet to be permselective.

A further advantage of the present invention is that the manufacture of the permselective membrane may be performed on equipment available in the textile industry for dyeing and finishing fabrics or films, though the chemical to be attached by covalent bonds to the cellulose molecules are not necessarily colored in the manufacture of the permselective membranes.

According to a broad aspect of the invention, there is provided a process for making permselective membranes, comprising reacting a cellulosic film or parchementized cellulosic sheet of about 0.1 mm. thickness with an aqueous solution of a sulfonated compound of the group consisting of a sulfonated trichloropyrimidine dye, a sulfonated 2,3-dichloroquinoxaline reactive dye, and a sulfonated dichloro-s-triazine, in high concentration for a period of time in the order of at least three hours until said cellulosic sheet is converted to a permselective membrane exhibiting permselectivity exceeding 14 mv. in a cell containing N/10 to N/20 potassium chloride, and exhibiting an electrical resistance of less than 20 ohms/cm.$^2$.

According to one described embodiment of the invention, the compound reacted with the cellulosic film or sheet is mono-sulphanilyl-dichloro-s-triazine.

According to another described embodiment, the compound reacted with the cellulosic film or sheet is trichloropyrimidine substituted sulfonated monoazo dye.

According to a further described embodiment, the compound reacted with the cellulosic film or sheet is sulphaminyl-dichloro-s-triazine.

According to a still further described embodiment, the compound reacted with the cellulosic film or sheet is a carboxamido-2,3-dichloroquinoxaline of 1 - amino - 2,5,7-naphthalene tri-sulfonic acid.

A better and fuller understanding of the present invention may be had by referring to the following examples, which are to be construed in a non-limiting manner.

EXAMPLE 1

A sheet of cellophane of about 0.1 mm. thickness was immersed for about 2 hours in a 10 percent by weight aqueous solution of mono-sulfanilyl-dichloro-s-triazine at a pH of between 6.0 and 7.0 and the steadily agitated solution was maintained at a temperature, between 25°–30° C. At the end of this period the pH of the solution was adjusted by the addition of an alkali (such as sodium carbonate, sodium bicarbonate, sodium phosphate or sodium hydroxide) to a pH of between 8 and 12 and the sheet was maintained in the solution for an additional 3 hours.

After rinsing with warm and subsequently with cold water, there was obtained a mechanically strong permselective membrane. The electrical resistance of this membrane varied between about 2.0 and 5.0 ohms/cm.$^2$ and its permselectivity between N/10 and N/20 aqueous potassium chloride was 14–16 mv.

It is assumed that the product has a structure as follows, but the invention does not rely on the validity of this proposed structure.

CELLULOSE—O—C⟨N=C(Cl)—N=C—NH—⟨O⟩—SO$_3$H

EXAMPLE 2

Parchment paper of about 0.15 mm. thickness was immersed under steady movement during 6 hours in 20 percent by weight aqueous solution of a compound prepared by reacting tetrachloropyrimidine and the monoazoic dye of the following chemical formula:

⟨SO$_3$H / O / SO$_3$H⟩—N=N—⟨HO / HO$_3$S / SO$_3$H⟩—NH—C(=N)—C(Cl)=C(Cl)—N at a temperature of 20–40° C. and at a pH of between 6.0 and 7.0. After this the pH was adjusted to 11 to 12 by the addition of an alkali, as in Example 1, and the paper was maintained in the solution for a further 3 hours at 90–100° C. After this the membrane was rinsed in water. Its electrical resistance was between 2–5 ohms/cm.$^2$ and the permselectivity KCl was 14–16 mv. measured in a cell containing N/10 KCl and N/20 KCl separated by the test membrane at room temperature.

EXAMPLE 3

A cellophane sheet of about 0.1 mm. thickness was maintained during 2 hours with constant agitation in an aqueous 5.0 percent by weight solution of sulfaminyl-dichloro-s-triazine of the following formula:

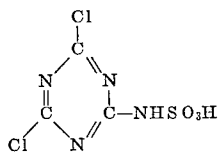

at a pH of 6.0 to 7.0. After this the pH of the solution was adjusted by the addition of alkali, as in Example 1, to pH 11.0 to 12.0 and the sheet was left in the solution for a further hour.

After rinsing and drying the sheet was treated during 20 minutes with 5.0 percent aqueous sodium hydroxide, presses out and immersed during 2 hours with constant agitation in a 10 percent by weight acetonic solution of propane sultone. The sheet was rinsed with warm and cold water, and dried. There was obtained a cation-selective membrane having a resistance of about 3–6 ohms/cm.$^2$ and a permselectivity of 14–16 mv. between N/10 and N/20 potassium chloride.

EXAMPLE 4

Parchment paper of about 0.12 mm. thickness was maintained during 4 hours in a 10 percent by weight aqueous solution of the 6-carbonylo-2,3-dichloroquinoxaline derivative of 1-amino-2,5,7 naphthalene trisulfonic acid. The agitated solution was maintained at a temperature between 30–35° C. and at a pH of 6.0 to 7.0. After this period the pH was adjusted to about 10 by the addition of an alkaline compound, e.g. sodium carbonate, sodium triphosphate, and maintained in this solution during 8 hours at 40–50° C. After rinsing with warm and cold water, a mechanically strong membrane was obtained. The electrical resistance of this membrane was about 2–6 ohms/cm.$^2$, its permselectivity between N/10 and N/20 potassium chloride being 13–15 mv.

I claim:
1. A process for making permselective membranes, comprising reacting a cellulosic film or parchmentized cellulosic sheet of about 0.1 mm. thickness with an aqueous solution of a sulfonated compound of the group consisting of a sulfonated trichloropyrimidine dye, a sulfonated 2,3-dichloroquinoxaline reactive dye, and a sulfonated dichloro-s-triazine, in high concentration for a period of time in the order of at least three hours until said cellulosic film or sheet is converted to a permselective membrane exhibiting permselectivity exceeding 14 mv. in a cell containing N/10 to N/20 potassium chloride, and exhibiting an electrical resistance of less than 20 ohms/cm.$^2$.

2. A process as claimed in claim 1, wherein the compound reacted with the cellulosic film or sheet is monosulphanilyl-dichloro-s-triazine.

3. A process as claimed in claim 1, wherein the compound reacted with the cellulosic film or sheet is trichloropyrimidine substituted sulfonated monoazo dye.

4. A process as claimed in claim 1, wherein the compound reacted with the cellulosic film or sheet is sulphaminyl-dichloro-s-triazine.

5. A process as claimed in claim 1, wherein the compound reacted with the cellulosic film or sheet is a carboxamido - 2,3-dichloro quinoxaline of 1-amino-2,5,7-naphthalene trisulfonic acid.

References Cited

UNITED STATES PATENTS 1,886,480  11/1932  Haller et al. _____ 260—146

FOREIGN PATENTS 729,511  3/1966  Canada _____ 8—1(.20)

DONALD LEVY, Primary Examiner

U.S. Cl. X.R.

8—3, 7, 54.2; 204—296

UNITED STATES PATENT OFFICE
CERTIFICATE OF CORRECTION

Patent No. 3,579,288　　　　Dated May 18, 1971

Inventor(s) Adalbert Süszer

It is certified that error appears in the above-identified patent and that said Letters Patent are hereby corrected as shown below:

In the title, "TRIOZINES" should read -- TRIAZINES --.
In the heading to the printed specification, line 6,
"Adalbert Suszer" should read -- Adalbert Süszer --.
Example 2, column 2, lines 55-63, right terminal portion
of the formula should appear as shown below

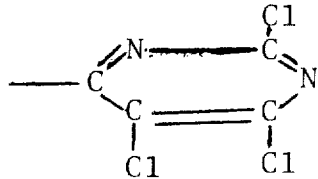

Signed and sealed this 10th day of October 1972.

(SEAL)
Attest:

EDWARD M. FLETCHER, JR.　　　　ROBERT GOTTSCHALK
Attesting Officer　　　　　　　　Commissioner of Patents